United States Patent
Mondal et al.

(10) Patent No.: US 8,000,293 B2
(45) Date of Patent: Aug. 16, 2011

(54) METHOD AND APPARATUS FOR PERFORMING SPATIAL-DIVISION MULTIPLE ACCESS

(75) Inventors: Bishwarup Mondal, Austin, TX (US); Xiangyang Zhuang, Hoffman Estates, IL (US); Kevin L. Baum, Rolling Meadows, IL (US); Timothy A. Thomas, Palatine, IL (US); Frederick W. Vook, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 424 days.

(21) Appl. No.: 12/192,164

(22) Filed: Aug. 15, 2008

(65) Prior Publication Data

US 2008/0305805 A1    Dec. 11, 2008

Related U.S. Application Data

(62) Division of application No. 11/275,938, filed on Feb. 6, 2006, now Pat. No. 7,426,198.

(51) Int. Cl.
*H04W 4/00* (2009.01)

(52) U.S. Cl. ........ 370/329; 370/328; 370/342; 375/233; 375/341; 375/262

(58) Field of Classification Search .................. 370/329, 370/328, 334; 455/562.1
See application file for complete search history.

(56) References Cited

U.S. PATENT DOCUMENTS

| | | | |
|---|---|---|---|
| 6,134,277 A | 10/2000 | Shah | |
| 6,363,341 B1 | 3/2002 | Tolhuizen et al. | |
| 6,463,295 B1 * | 10/2002 | Yun | 455/522 |
| 6,563,812 B1 | 5/2003 | De | |
| 6,754,624 B2 | 6/2004 | Choy et al. | |
| 6,982,968 B1 | 1/2006 | Barratt et al. | |
| 7,746,829 B2 * | 6/2010 | Lechleider et al. | 370/334 |
| 2003/0100343 A1 | 5/2003 | Zourntos et al. | |

OTHER PUBLICATIONS

Blaine R. Copenheaver, "Corresponding Application PCT/US2007/060894—PCT International Search Report and Written Opinion," WIPO, ISA/US, Commissioner for Patents,Alexandria, VA, USA, Oct. 29, 2007, 8 pages, most relevant pp. 3, 6-7.

Philippe Becamel, "Corresponding Application PCT/US2007/060894—PCT International Preliminary Report on Patentability," The International Bureau of WIPO, Geneva, Switzerland, Aug. 21, 2008, 6 pages, most relevant pp. 2, 5-6.

Korean Examiner, "Notice of Preliminary Rejection," Korean Intellectual Property Office, Daejeon, Republic of Korea, Jun. 25, 2010, 4 pages, most relevant pp. 1.

* cited by examiner

*Primary Examiner* — David Q Nguyen

(57) ABSTRACT

A method and apparatus for performing spatial-division multiple access within a communication system is provided herein. During operation, nodes will return null subspace information along with their channel subspace information. The null subspace is similar to the channel subspace except that the null subspace information directs a base station to the matrix in a predefined codebook that results in minimum power being received at the node. The null subspace for each node is taken into consideration when communicating with a particular node.

12 Claims, 3 Drawing Sheets

101

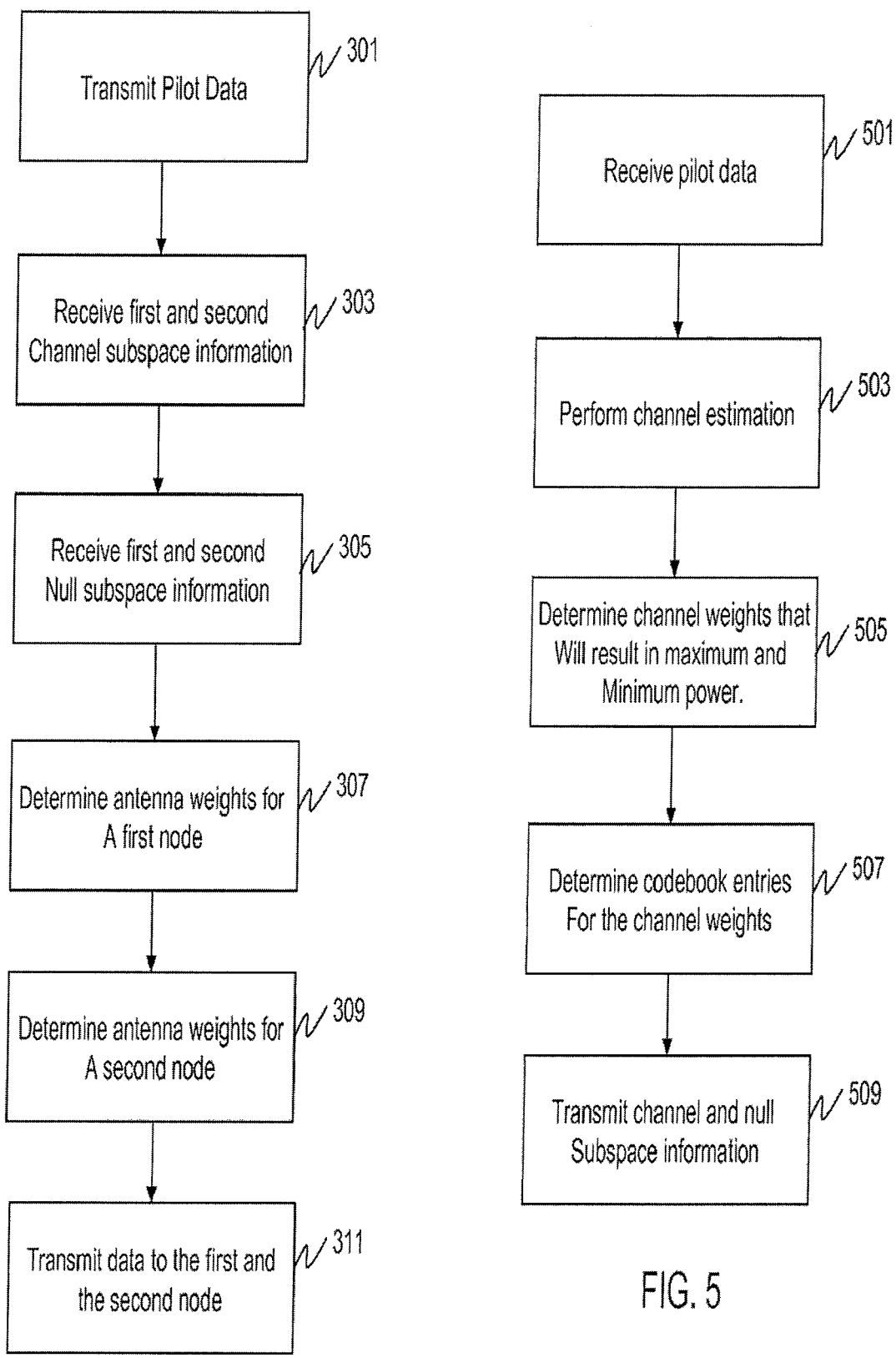

METHOD AND APPARATUS FOR PERFORMING SPATIAL-DIVISION MULTIPLE ACCESS

FIELD OF THE INVENTION

The present invention relates generally to spatial-division multiple access and in particular, to a method and apparatus for performing spatial-division multiple access within a communication system employing multiple nodes.

BACKGROUND OF THE INVENTION

Transmit beamforming (sometimes referred to as transmit adaptive array (TXAA) transmission) increases the effective signal-to-noise seen by a receiver device by creating a coverage pattern that tends to be directional in nature (i.e., not uniformly broadcast). This is accomplished by employing multiple antennas at the transmit site and weighting each antenna such that the combined transmissions result in a beamformed pattern that delivers maximum power/energy to the receiver. In the case of transmitting multiple streams to multiple receivers (i.e., transmit spatial division multiple access or SDMA), it would be beneficial to compute the antenna weights so that minimum cross talk or interference between users is achieved. In other words, in addition to choosing an antenna matrix (i.e., the weights for each antenna) that maximizes power to the desired receiver, it would additionally be beneficial to minimize power to the non-desired receivers. However, accomplishing this requires full channel knowledge at the transmitter which is difficult to get in practical communications because of the large amount of feedback required to obtain the full channel knowledge. Therefore, a need exists for a method and apparatus for performing spatial-division multiple access within a communication system employing multiple nodes that minimizes cross-talk or interference for non-desired receivers while employing a practical feedback method.

BRIEF DESCRIPTION OF THE DRAWINGS

FIG. 3 is a flow chart showing the operation of the node of FIG. 2 during transmission.

FIG. 5 is a flow chart showing the operation of the node of FIG. 4 during calculation of a channel subspace and a null subspace.

DETAILED DESCRIPTION OF THE DRAWINGS

Figure 1:
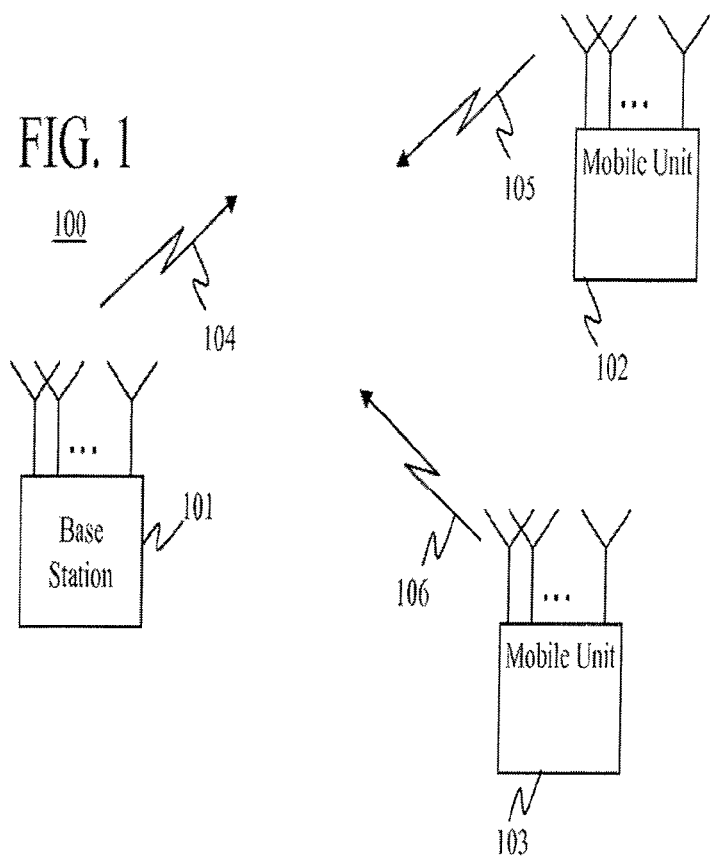
FIG. 1 is a block diagram of a communication system employing spatial-division multiple access.

In order to address the above-mentioned need, a method and apparatus for performing spatial-division multiple access within a communication system is provided herein. During operation, nodes will return null subspace information along with their channel subspace information. The null subspace is similar to the channel subspace except that the null subspace information directs a base station to the matrix in a predefined codebook that results in minimum power being received at the node. The null subspace for each node is taken into consideration when communicating with a particular node.

The present invention encompasses a method comprising the steps of transmitting pilot data to a first and a second node from multiple antennas, receiving a first and a second channel subspace information from the first and the second nodes in response to the transmission, and receiving first and second null subspace information from the node in response to the transmission. The first channel subspace information is utilized along with the second null subspace information to determine antenna weights for the first node. Additionally, the second channel subspace information is utilized along with the first null subspace information to determine antenna weights for the second node. Finally, data is transmitted to the first and the second nodes simultaneously utilizing the first and the second antenna weights, respectively.

The present invention additionally encompasses a method comprising the steps of receiving pilot data from a base station that is transmitted from multiple antennas, determining channel subspace information based on the received pilot data, determining null subspace information based on the received pilot data, and transmitting the channel subspace information and the null subspace information for use by the base station in determining antenna weights.

The present invention additionally encompasses an apparatus comprising a transmitter transmitting pilot data, a receiver receiving first and second channel subspace information from a first and a second node and first and second null subspace information from the first and the second node, and stream weighting circuitry utilizing the first channel subspace information and the second null subspace information to determine first antenna/stream weights for the first node, the stream weighting circuitry additionally utilizing the second channel subspace information and the first null subspace information to determine second antenna/stream weights for the second node.

The present invention additionally encompasses an apparatus comprising a receiver receiving pilot data from a base station that is transmitted from multiple antennas, logic circuitry determining channel subspace information based on the received pilot data and determining null subspace information based on the received pilot data, and transmitting circuitry transmitting the channel subspace information and the null subspace information for use by the base station in determining antenna weights.

Prior to describing a method and apparatus for performing spatial-division multiple access, the following definitions are provided to set the necessary background for utilization of the preferred embodiment of the present invention.

Vector space—a set that consists of all linear combinations of a particular collection of vectors Subspace—a vector space that is a portion of a larger vector space.

Null Subspace—a subspace for a particular receiving node that if used by the base station to compute transmit weights, will result in zero power/energy received at the node. In mathematical terms, it is the "null space" of the channel response matrix, where the term "null space" is well defined in matrix theory. The channel response matrix contains the channel response between each transmit antenna and each receive antenna.

Channel Subspace—a subspace for a particular node that if used by the base station to compute transmit weights, will result in maximum power/energy received at the node. In mathematical terms, it is the "range" of the channel response matrix, where the term "range" is well defined in matrix theory. The channel response matrix contains the channel response between each transmit antenna and each receive antenna.

Turning now to the drawings, wherein like numerals designate like components, FIG. 1 is a block diagram of communication system 100. In the preferred embodiment of the present invention, communication system 100 utilizes an Orthogonal Frequency Division Multiplexed (OFDM) or multicarrier based architecture. In alternate embodiments of the present invention, this architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques.

As shown, communication system 100 comprises a base station 101 and multiple mobile or stationary nodes 102-103. Although only a single base station and two nodes are shown, one of ordinary skill in the art will recognize that such communication systems generally comprise multiple base stations 101 in communication with many nodes 102-103. During operation, communication system 100 utilizes SDMA to beamform transmissions between base station 101 and nodes 102-103. As discussed above, beamforming is accomplished by employing multiple antennas at the transmit site and weighting each antenna such that the combined transmissions result in a beamformed pattern having a maximum power received at the receivers with a minimum cross talk or interference between users. Minimizing crosstalk is very beneficial for SDMA, because SDMA involves transmitting to two or more nodes simultaneously on the same channel resource (e.g., time slot, subcarrier, subchannel, etc.).

In order to determine the appropriate antenna weights for a user, in the preferred embodiment of the present invention base station 101 broadcasts a pilot from each of its antennas that are received by nodes 102-103. Nodes 102-103 perform channel estimation based on the received pilots and determine a channel subspace that results in a maximum received power at the individual mobile when the base uses the channel subspace to compute transmit weights. In the preferred embodiment of the present invention the channel subspace comprises a codebook index that directs the base station to the appropriate antenna matrix within a predetermined codebook shared between the base and the nodes. However, in alternate embodiments of the present invention, the channel subspace may comprise the actual channel matrix itself. Once a node determines the appropriate channel subspace, the channel subspace information is transmitted to base station 101 where it is utilized (with other information) to determine the appropriate antenna weights for the particular node.

As discussed above, it also would be beneficial for base station 101 to compute the antenna weights so that minimum cross talk or interference between users is achieved. In other words, in addition to choosing an antenna matrix (i.e., the weights for each antenna) that maximizes power to the desired receiver, it would additionally be beneficial to minimize power to the non-desired receivers. Thus, for example, when transmitting to node 102, it would be beneficial if along with maximizing the power at node 102, the antennas weights for transmitting to node 102 additionally minimized the received power at node 103, especially in the case of SDMA transmission.

In order to address this issue, in the preferred embodiment of the present invention multiple nodes will return null subspace information along with their channel subspace information. The null subspace is similar to the channel subspace except that the null subspace information directs base station 101 to the matrix in a predefined codebook that results in minimum power being received at the node. The null subspace for each node is taken into consideration when communicating with a particular node. Thus, for example, if both nodes 102 and 103 have communicated their channel subspace and null subspace information to base station 101, base station 101 will compute the antenna weights utilized for communication to mobile 102 based on both the channel subspace returned by mobile 102 and the null subspace returned by mobile 103. This will have the effect of maximizing power to mobile 102, while minimizing power to mobile 103. More particularly, the null subspace to mobile 103 is used to create a projection matrix that will project a matrix (or vector) onto the null subspace associated with mobile 103. This projection matrix is applied to the channel subspace of mobile 102 to create a projected channel subspace for mobile 102. Then the transmit SDMA weights (i.e., antenna weights) for mobile 102 are computed using this projected channel subspace. The power is minimized to mobile 103 through the application of the projection matrix to the channel subspace for 102. The power is maximized to mobile 102 by designing weights that are the singular vectors associated with the largest singular values of the projected channel subspace for mobile 102. A detailed explanation of how this is accomplished is described below.

A Spatial Division Multiple Access (SDMA) strategy comprises the design of transmit filters (or antenna weights) for each user. Considering a system with K users (nodes), $M_t$ transmit antennas at the base, $M_r$ receive antennas at each mobile (user or node), and $M_s$ data streams to be transmitted to each mobile, the system may be described by K equations as:

$$y_k = H_k \sum_{k=1}^{K} W_i x_i + n_k, k = 1, \ldots, K \quad (1)$$

where, $H_k$ is the $M_r \times M_t$ channel matrix for user k, $W_i$ is the $M_t \times M_s$ SDMA transmit filter (i.e., antenna weight) for mobile i (designed to minimize crosstalk to other mobiles while maximizing signal power to the mobile i), $x_i$ is the $M_s \times 1$ symbol vector for mobile i (e.g., a vector of QPSK symbols), and $n_k$ is the additive noise for the k-th user. The goal is to design $W_i$ (i=1, ..., K) such that the average BER of K users is minimized.

Note that the assumption that each mobile has $M_r$ receive antennas was only illustrative and that each mobile can have a different number of receive antennas.

Subspace Average Based SDMA with the Null and the Channel Subspace Provided

In the following text, it is assumed that the base station has full channel knowledge (i.e., the base has perfect channel state information (CSI)) to all mobiles and is designing transmit SDMA weights. The main purpose of the transmit SDMA weights described now is to introduce the concept of subspace averaging that can be used by the base station to compute transmit SDMA weights when the base station has the channel subspace to mobile 102 and the null subspace to mobile 103 (instead of full channel knowledge to both). The high-level idea behind the subspace averaging is to improve the transmit SDMA weights by allowing some level of crosstalk (i.e., interference from the transmission intended for mobile 102 being received by mobile 103) that is insignificant given the noise power at mobile 103. By allowing this crosstalk, the received power can be increased at mobile 102 over transmit SDMA weights that allow no crosstalk.

In the following an antenna-weighting approach is introduced based on subspace averaging. Consider K users for SDMA with channels $H_1, \ldots, H_K$ and let us assume that $M_s$ data streams will be transmitted to each user. The objective is to determine the corresponding SDMA weights $W_1, \ldots, W_K$. Assuming that the base has channel space information (e.g., the null and the channel subspace obtained through channel sounding or channel feedback) and $M_t > KM_s$, the computation of $W_k$ is obtained with the following steps:

Subspace Average SDMA

1) Define null$\{H_1, \ldots, H_K\}$: Assume $M_t > KM_s$ and let $H_1, \ldots, H_K$ be the K channel matrices for each mobile each of size $M_r \times M_t$ with complex entries. Define the $KM_r \times M_t$ matrix $J = [H_1^H | H_2^H | \ldots | H_K^H]^H$. The $(M_t - KM_s)$ right singular vectors of J corresponding to the zero singular values are stacked into columns to form the $M_t \times (M_t - KM_s)$ orthonormal matrix defined as null$\{H_1, \ldots, H_K\}$.

2) Define $V = \text{avg}(V_1, V_2)$: Assume $V_1, V_2$ are $M_t \times M_s$ orthonormal matrices and define the "subspace distance" between the subspaces spanned by orthonormal matrices $V_1$ and $V_2$ as $\text{dist}(V_1, V_2) = \|V_2 V_2^H - V_1 V_1^H\|_2$ where $\|*\|_2$ is the matrix 2-norm as well defined in matrix theory. The orthonormal matrix $V = \text{avg}(V_1, V_2)$ denotes that the subspace spanned by the orthonormal matrix V has equal distance to the subspaces spanned by $V_1$ and $V_2$. The matrix V may be computed as in the following. The $M_s$ dominant eigenvectors of $(V_1 V_1^H + V_2 V_2^H)$ stacked into the columns of a $M_t \times M_s$ matrix constitute $\text{avg}(V_1, V_2)$. Note that this subspace average may be extended to an average of any number of subspaces represented by their basis by $V_1, V_2, \ldots$ and can also be extended to a weighted average.

3) For user k obtain $N_k = \text{null}(H_1, \ldots, H_{k-1}, H_{k+1}, \ldots, H_K)$ and the orthogonal projection matrix $P_k = N_k N_k^H$.

4) For user k let $V_k$ be an $M_t \times M_s$ orthonormal matrix formed by the $M_s$ dominant right singular vectors of $H_k$.

5) Compute $W_k = \text{avg}(V_k, P_k V_k)$.

Note that $W_k = V_k$ implies that interference is ignored, $W_k = P_k V_k$ implies interference cancellation or nullforming (i.e., zero crosstalk at mobile 103 if user k is mobile 102). By using the subspace averaging, some level of crosstalk is present at mobile 103, but the power delivered to mobile 102 is increased. As long as the level of crosstalk at mobile 103 is below the noise power, the performance is unaffected at mobile 103.

Subspace Average Based SDMA with Quantized CSI (i.e., Codebook-Based CSI)

Now that the concept of subspace averaging is introduced, it will now be used to design transmit SDMA weights at the base station when only the channel and null subspaces for each mobile are known by the base station. Assume that there are K mobiles (each with $M_r$ receive antennas) with $M_r \times M_t$ downlink channels $H_1, \ldots, H_K$ that are measured by the mobile from pilot signals sent from each of the $M_t$ transmit antennas at the base station. The idea is to devise a codebook based quantization strategy that enables a practical method for the mobile to feedback its null and channel subspaces to the base station. For each user, the feedback consists of the quantized null subspace $Q(N_k)$ and the quantized channel subspace $Q(V_k)$ determined by the following algorithm. Note that the quantization can be done by selecting an entry out of a codebook of B matrices (the dimension of the matrices is given below). The codebooks can be designed as known in the art, D. J. Love, R. W. Heath, Jr., and T. Strohmer, "Grassmannian Beamforming for Multiple-Input Multiple-Output Wireless Systems," *IEEE Transactions on Information Theory*, October 2003.

Codebook Quantization for K Mobile Users Supporting Narrowband SDMA

Define channel subspace quantization for each mobile: $Q(V_1) = _{V \in C}^{\arg\max} \|H_1^* V\|_2$, through $Q(V_K) = _{V \in C}^{\arg\max} \|H_K^* V\|_2$, where C is the codebook of $M_s$ dimensional subspaces of $C^{M_t}$.

Define null subspace quantization for each mobile: $Q(N_1) = _{V \in C'}^{\arg\min} \|H_1^* V\|_2$, $Q(N_K) = _{V \in C'}^{\arg\min} \|H_K^* V\|_2$, C' is the codebook of $(M_t - M_r)$ dimensional subspaces of $C^{M_t}$.

Mobile u communicates its quantized channel subspace to the base station by feeding back the index of the codebook matrix that maximizes $\|H_u^* V\|_2$ where $V \in C$. Mobile u communicates its quantized null subspace to the base station by feeding back the index of the codebook matrix that minimizes $\|H_u^* V\|_2$ where $V \in C'$.

The codebooks C and C' may be designed by uniformly spacing points on the Grassmann manifold using any available algorithm in the art. The transmit SDMA weights may be computed at the base station with the following steps.

Subspace Average SDMA Weight Computation with Quantization

This algorithm assumes that the base station will simultaneously transmit to K mobiles. The following steps are used to compute the transmit SDMA weights:

1) Compute the orthogonal projection matrix for mobile u as:

$$P_u = \prod_{\substack{k=1 \\ k \neq u}}^{K} Q(N_k) Q(N_k)^H.$$

2) Compute the SDMA weight for mobile u as $W_u = \text{avg}(Q(V_u), P_u Q(V_u))$.

The base station will use the transmit weights (i.e., antenna weights), $W_u$, to beamform the data to mobile u and these weights will maximize the power to one mobile while providing little interference to the other K−1 mobiles.

SDMA for MIMO-OFDM with Perfect Channel State Information (CSI)

The next step is to apply the above algorithms developed for flat-faded MIMO to broadband (e.g., OFDM) MIMO systems. In the following, a MIMO-OFDM system is considered, with the full bandwidth being allocated to all the users and average BER is chosen as the performance metric. With perfect channel knowledge (i.e., perfect CSI) at the transmitter the SDMA weights may be computed independently for each subcarrier using the subspace average solution.

SDMA for MIMO-OFDM with Quantized CSI

As in the case of flat fading channels, we will assume there are K users with channels represented by $H_1(f)$ through $H_K(f)$ $f = 1, \ldots, N$ where f is the subcarrier index and N is the total number of subcarriers. Then, the null subspace and the channel subspace information for each subcarrier may be quantized, specifically $Q(N_1(f)), Q(V_1(f)), \ldots, Q(N_K(f)), Q(V_K(f))$ and the subspace average based SDMA solution given above may be applied to each subcarrier independently. In this case the feedback load increases by N-fold compared to a flat fading MIMO channel. However, because there is typically correlation between the channel on adjacent subcarriers, the amount of feedback can be reduced as follows.

Due to the fact that the number of resolvable multipath components are typically less than the number of subcarriers, the adjacent subcarrier channels are correlated and this fact may be exploited to reduce feedback information. The adjacent subcarriers may be grouped to form a cluster that share a common SDMA weight and provide a common feedback for the channel subspace and the null subspace. Considering an arbitrary cluster of F subcarriers (F≦N) and representing the subcarriers in that cluster by 1, ..., F, the common feedback information may be determined as follows.

Clustering Based Codebook Quantization for K Mobile Users for OFDM SDMA

1) Define the "cluster channel subspace" for mobile u as:

$$Q(V_u) = \underset{V \in C}{\operatorname{argmax}} \sum_{f=1}^{F} \|H_u^*(f)V\|_2$$

where C is the codebook of $M_s$-dimensional subspaces in $C^{M_t}$ (i.e., a space formed by all $M_t$-dimensional complex-valued vectors)

2) Define the "cluster null subspace" for mobile u as:

$$Q(N_u) = \underset{V \in C'}{\operatorname{argmax}} \sum_{f=1}^{F} \|H_u^*(f)V\|_2,$$

where C' is the codebook of $(M_t - M_r)$ dimensional subspaces in $C^{M_t}$.

The codebooks can be designed as in the flat faded case presented above. Note that in the above definitions that the subcarriers in a cluster are from 1 to F but in general the cluster can be any group of F subcarriers from the N data-carrying subcarriers.

Mobile u communicates its quantized cluster channel subspace to the base station by feeding back the index of the codebook matrix that maximizes $$\sum_{f=1}^{K} \|H_u^*(f)V\|_2$$

where V∈C. Mobile u communicates its quantized cluster null subspace to the base station by feeding back the index of the codebook matrix that minimizes $$\sum_{f=1}^{F} \|H_u^*(f)V\|_2$$

where V∈C'. Each mobile will feed back the quantized cluster channel and null subspaces for each cluster in the N data-carrying subcarriers that the base station requests feedback for.

Special cases of clustering include cluster size of one (i.e., F=1), meaning that each subcarrier is treated independently or cluster size of F=N, when only one SDMA weight is used for all the subcarriers. Recall that in the case of $M_s = M_r$, either channel subspace or null subspace information is sufficient because one of the two subspaces can be derived from the other.

Figure 2:
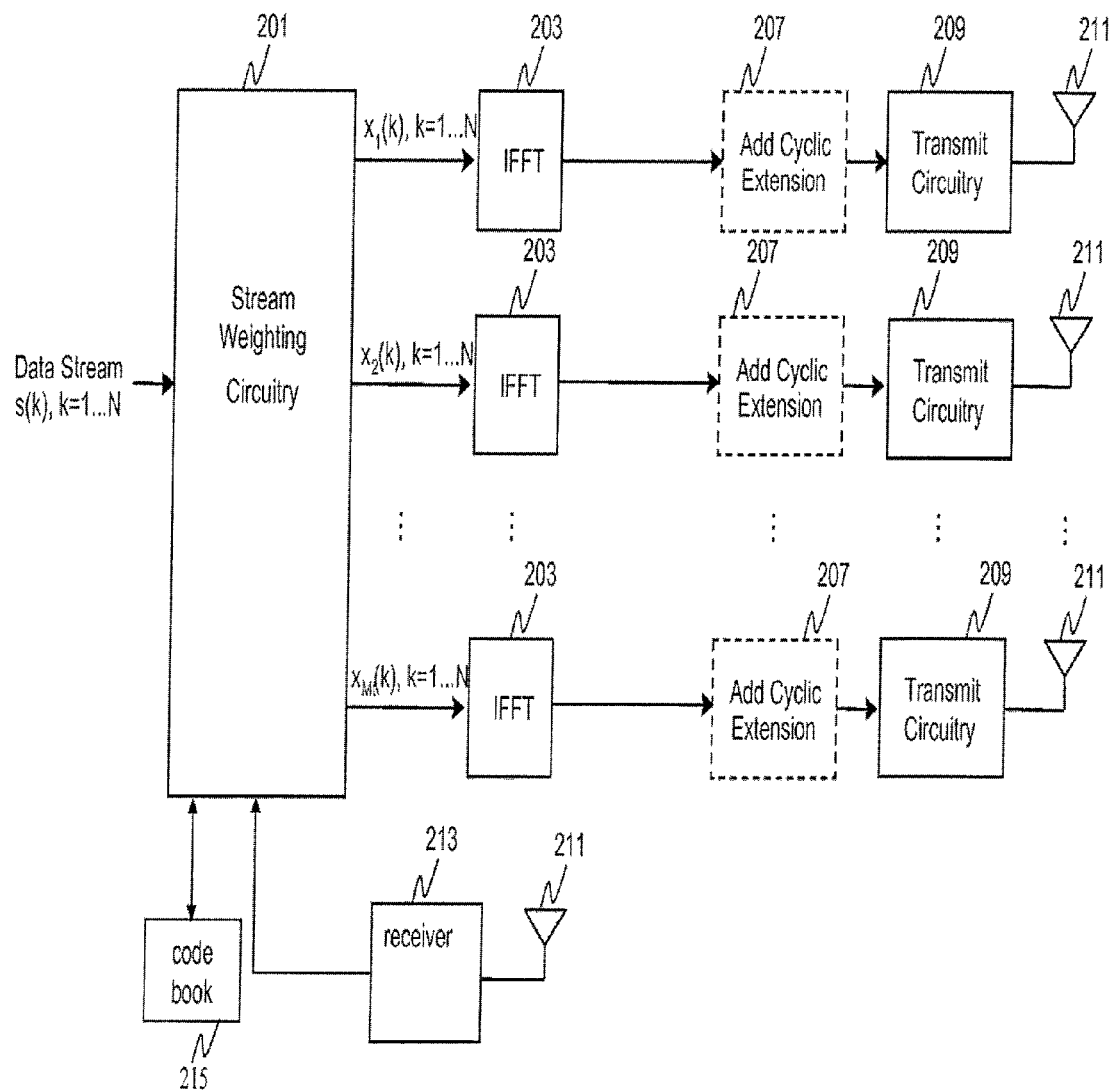
FIG. 2 is a block diagram of a node used by the communication system of FIG. 1.

FIG. 2 is a block diagram of base station 101. Base station 101 comprises stream weighting circuitry 201, inverse Fast Fourier Transform (IFFT) circuitry 203, optional cyclic prefix circuitry 207 and transmitter 209. During operation a data stream s(f), f=1, 2, ... N enters stream weighting circuitry 201 (where N is the number of subcarriers). Note that the weighting operation performed by the stream weighting circuitry will be repeated for each of the $M_s$ data streams at each of the K nodes (mobiles). Stream weighting circuitry 201 outputs a plurality of weighted data streams, and in particular, one weighted data stream per antenna. Each weighted data stream (alternatively referred to as "antenna stream") is appropriately weighted in the frequency domain by an antenna-specific weight $v_n(f)$ where n=1, 2, ... $M_t$, where $M_t$ is the number of antennas 211. Note that the weights may or may not be different on each beamformed subcarrier. Assuming $v_m(f)$ is the weight for antenna m and subcarrier f, then stream weighting circuitry 201 outputs weighted data/antenna stream $x_m(f) = v_m(f)s(f)$ for antenna m. In the case where the data on some of the subcarriers is not to be beamformed, the data/antenna stream s(f) for those subcarriers are fed directly into the $f^{th}$ subcarrier as the input to the IFFT. In other words, on those subcarriers, the $v_m(f)$ are effectively set to one.

IFFT circuitry 203 performs an inverse Fast Fourier Transform on each weighted data stream, converting the frequency-domain data stream into a time-domain data stream. An optional cyclic extension operation is then carried out via cyclic extension circuitry 207 on the circularly-shifted antenna streams. In particular, a cyclic prefix, or guard interval is added. The cyclic prefix is typically longer than the expected maximum delay spread of the channel. As one of ordinary skill in the art will recognize, the cyclic extension can comprise a prefix, postfix, or a combination of a prefix and a postfix. The cyclic extension is an inherent part of the OFDM communication system. The inserted cyclic prefix makes the ordinary convolution of the transmitted signal with the multipath channel appear as a cyclic convolution when the impulse response of the channel ranges from 0 to $L_{CP}$, where $L_{CP}$ is the length of the cyclic extension. Finally, the properly weighted, and circularly-shifted antenna data streams are OFDM modulated and transmitted by transmitters 209 from antennas 211.

As is evident, base station 101 additionally comprises receiver 213 for receiving channel and null subspace information transmitted by nodes. For example, node 102 will transmit subspace information 105 and node 103 will transmit subspace information 106, which will be received by receiver 213. This information will be passed to stream weighting circuitry 201 in order to determine the appropriate antenna/stream weightings to use when communicating to a particular node.

FIG. 3 is a flow chart showing operation of the base station of FIG. 2. The logic flow begins at step 301 where pilot data is transmitted to at least a first and a second node. The transmission of pilot data simply comprises the transmission of a known sequence from each of the multiple antennas 211. The known sequence could be different for each antenna, and/or could be transmitted on different channel resources from each antenna. In response, receiver 213 receives first and second channel subspace information from the first and the second nodes at step 303. As discussed above, the channel subspace information comprises information on which antenna weights will be calculated that maximize the power to the mobile. In the preferred embodiment of the present invention this information comprises an index to codebook 215 shared by base station 101 and mobiles 102-103.

Continuing, at step 305 first and second null subspace information is received from the first and second nodes by receiver 213. As discussed above, the null subspace information is received in response to the pilot data being transmitted, and comprises information on which antenna weights will be calculated that minimize power to the mobile. In the preferred embodiment of the present invention this information comprises an index to codebook 215 shared by base station 101 and mobiles 102-103.

At step 307 the first channel subspace information and the second null subspace information is utilized by stream weighting circuitry 201 to determine first antenna/stream weights for the first node, and at step 309 the second channel subspace information and the first null subspace information is used by stream weighting circuitry 201 to determine second antenna/stream weights for the second node. As discussed above, the first stream weights will maximize power to the first node while minimizing (or limiting the) power to the second node, while the second stream weights will maximize power to the second node while minimizing (or limiting the) power to the first node. Finally, at step 311 information or data is transmitted to the first and the second nodes utilizing the first and the second stream weights, respectively. The transmission to the first and second nodes using the first and second stream weights may occur simultaneously (e.g., in an SDMA fashion).

Figure 4:
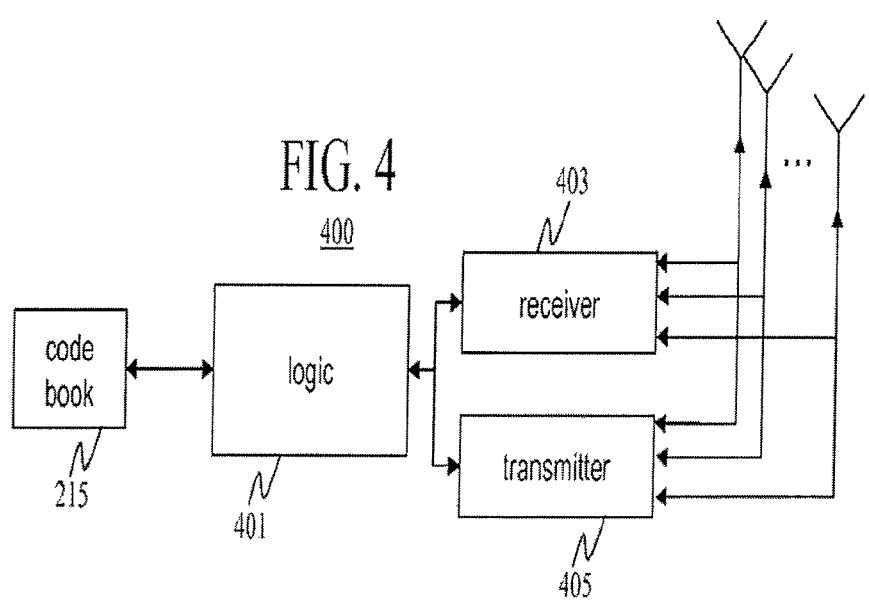
FIG. 4 is a block diagram of a node.

FIG. 4 is a block diagram of node 400. As shown, node 400 comprises logic circuitry 401, receiver 403, transmitter 405, and codebook 215. Logic circuitry 401 preferably comprises a microprocessor/controller and serves to determine the best codebook indices from the codebook 215 that represent the node's channel subspace and the node's null subspace based on pilot data received from the base station (the received pilot data is obtained by the logic circuitry 401 from the receiver 403). The logic circuitry provides the codebook indices to the transmitter 405 in order to feedback the indices to the base station.

FIG. 5 is a flow chart showing the operation of the node 400 during calculation of a channel subspace and a null subspace. The logic circuitry begins at step 501 where a pilot signal (pilot data) is received by receiver 403. As known in the art, a pilot signal comprises a known sequence, transmitted at a known time by each of the $M_t$ transmit antennas at the base. Receiver 403 computes a channel estimate and passes the channel estimates to logic circuitry 401 (step 503). Once the channel estimate is known, logic circuitry 401 determines subspaces that will result in maximum power and minimum power (step 505). Both are determined based on the channel estimates. Codebook 215 is accessed by logic circuitry 401 and appropriate indices are determined for the channel weights. (step 507). At step 509 channel subspace information and null subspace information is transmitted via transmitter 405 as codebook entries.

While the invention has been particularly shown and described with reference to a particular embodiment. For example, the matrix 2-norm ($\|A\|_2$) was used exclusively. However other matrix norms could also be used such as the Frobenius matrix norm. It will be understood by those skilled in the art that various changes in form and details may be made therein without departing from the spirit and scope of the invention. It is intended that such changes come within the scope of the following claims.

The invention claimed is:

1. A method for a mobile or stationary node in a communication system comprising the steps of:
    receiving pilot data from a base station that is transmitted from multiple antennas;
    determining null subspace information based on the received pilot data, wherein the null subspace information, when used by the base station to compute transmit antenna weights, results in minimal received power at the node; and
    determining channel subspace information based on the received pilot data, wherein the channel subspace, when used by the base station to compute transmit antenna weights, results in maximal received power at the node; and
    transmitting the channel subspace information and the null subspace information to the base station.

2. The method of claim 1 wherein the channel subspace information comprises a codebook entry.

3. The method of claim 1 wherein the channel subspace information comprises a codebook entry that, when used by the base station as the transmit antenna weights, can result in maximal received power at the node among all codebook entries.

4. The method of claim 1 wherein the null subspace information is used by the base station in determining the antenna weights.

5. The method of claim 1 further comprising the step of:
    receive beamformed transmissions from the base station that utilizes the null subspace information.

6. The method of claim 1 wherein the null subspace information comprises a codebook entry.

7. The method of claim 6 wherein the null subspace information comprises a codebook entry that, when used by the base station as the transmit antenna weights, can result in minimal received power or interference at the node among all codebook entries.

8. A node comprising:
    a receiver receiving pilot data from a base station that is transmitted from multiple antennas;
    logic circuitry determining null subspace information and channel subspace information based on the received pilot data, wherein the null subspace information, when used by the base station to compute transmit antenna weights, results in minimal received power at the node, and wherein the channel subspace information, when used by the base station to compute transmit antenna weights, results in maximal received power at the node; and
    transmitting circuitry transmitting the null subspace information and the channel subspace information for use by the base station in determining antenna weights.

9. The node of claim 8 wherein the receiver additionally receives beamformed transmissions that utilize the null subspace information.

10. The node of claim 8 wherein the channel subspace information comprises a codebook entry that maximizes transmit energy received from a base station.

11. The node of claim 8 wherein the null subspace information comprises a codebook entry that minimizes transmit energy received from a base station.

12. The node of claim 8 wherein the null subspace information is used by the base station for in determining antenna weights.

* * * * *